United States Patent [19]

Seki et al.

[11] Patent Number: 4,975,136

[45] Date of Patent: Dec. 4, 1990

[54] METHOD OF FILLER TAPING SCREEN FRAME AND METHOD OF FILLING SCREEN FRAME

[75] Inventors: Kameharu Seki; Isamu Kubo, both of Miyoshi, Japan

[73] Assignee: Nippon CMK Corp., Japan

[21] Appl. No.: 283,221

[22] Filed: Dec. 12, 1988

[30] Foreign Application Priority Data

Feb. 10, 1988 [JP] Japan .................................. 63-30643
Feb. 10, 1988 [JP] Japan .................................. 63-30645

[51] Int. Cl.[5] .............................................. B32B 31/12

[52] U.S. Cl. ................................ 156/212; 101/128.4; 156/160; 156/163; 156/292; 156/574; 428/901

[58] Field of Search ............. 101/127.1, 128.1, 128.21, 101/128.4; 156/212, 160, 163, 109, 107, 522, 574, 523, 292; 140/109; 160/378, 382; 428/901

[56] References Cited

U.S. PATENT DOCUMENTS

| | | | |
|---|---|---|---|
| 2,299,628 | 10/1942 | Johnson et al. | 101/127.1 |
| 3,213,897 | 10/1965 | Johnson | 140/109 |
| 3,892,618 | 7/1975 | Griebat | 156/522 X |
| 3,950,203 | 4/1976 | Van der Wal | 156/522 X |
| 4,129,076 | 12/1978 | Gardner | 101/127.1 X |
| 4,145,237 | 3/1979 | Mercier et al. | 156/109 X |
| 4,561,929 | 12/1985 | Lenhardt | 156/109 X |
| 4,627,886 | 12/1986 | Grone et al. | 156/574 X |
| 4,732,644 | 3/1988 | Chiu | 156/478 X |
| 4,781,782 | 11/1988 | Luhman et al. | 156/574 X |
| 4,856,424 | 8/1989 | Seki et al. | 101/128.4 |

*Primary Examiner*—Michael W. Ball
*Assistant Examiner*—Michele K. Yoder
*Attorney, Agent, or Firm*—Bruce L. Adams; Van C. Wilks

[57] ABSTRACT

Disclosed are a method of filler taping a screen frame and a method of filling a screen frame. The screen frame is held in such a manner as to be indexable 90 degrees, a tape is attached simultaneously on opposing two sides of the screen frame through linear motion. At the same time, a filling liquid is applied simultaneously on opposing two sides of the screen frame on the rear surface thereof. Subsequently, the screen is rotated 90 degrees, and taping and filling are similarly effected with respect to the remaining two sides.

6 Claims, 5 Drawing Sheets

METHOD OF FILLER TAPING SCREEN FRAME AND METHOD OF FILLING SCREEN FRAME

BACKGROUND OF THE INVENTION:

The present invention relates to the manufacture of a screen frame for use in screen printing, and more particularly to a method of filler taping and a method of filling in which the attachment of a tape and application of a filler liquid onto the four sides of a screen frame are performed after stretching of the screen.

At the time of screen printing, an area where no emulsion of the type used for producing a screen plate is applied must be formed at the marginal edge portions of the screen before application of the emulsion. If an area space with a width of 10 to 20 mm is to be provided for a 950 mm square frame, it is difficult to form this area accurately, and it thus becomes difficult to perform subsequent processing. More importantly, there is a need to prevent softening of the adhesive that is used to hold the screen in a stretched condition during development of the emulsion as such softening would make it impossible to obtain accurate screening. For these reasons, it is necessary to provide taping and filling at the four sides of the frame in the vicinity of the edges thereof.

Heretofore, taping and application of a filling liquid on the rear side of a screen have been carried out manually. However, there are many cases where a tape is adhered unevenly, and it generally takes about 20 minutes to perform these operations for one frame.

In recent years, printed circuit boards on which various electronic parts are mounted have come to be required in large quantities and such involves mass production systems in which screen printing is employed. Hence, the demand for screen plate frames has also increased, and industry has been called upon to supply them at low cost. The conventional manual operations cannot meet these requirements in terms of production quantity and cost.

SUMMARY OF THE INVENTION:

Accordingly, an object of the present invention is to provide a method of automating the operations of taping and application of a filling liquid for the protection of contact surfaces of a screen plate frame and a screen, thereby overcoming the above-described drawbacks experienced with the conventional manual operations.

To this end, according to one aspect of the invention, there is provided a method of filler taping a screen frame comprising the steps of: holding a screen frame in such a manner as to be indexable at angular increments of 90 degrees; attaching a tape simultaneously on two opposed sides or portions of the screen frame through linear motions; rotating the screen frame 90 degrees; and attaching the tape simultaneously on the remaining two opposed sides or portion of the screen frame through linear motions, thereby taping the screen frame.

According to another aspect of the invention, in connection with the above-described taping operation, there is provided a method of filler taping a screen frame comprising the steps of: holding a screen frame in such a manner as to be indexable 90 degrees; attaching a tape simultaneously on two opposed sides or portion of the screen frame through linear motions; rotating the screen frame 90 degrees; and attaching the tape simultaneously on the remaining two opposed sides or portion of the screen frame through linear motions and, simultaneously with the attachment of the tape on the two opposed sides or portion, applying a filling liquid on the two opposed sides on the rear side of the screen frame through linear motions, followed by applying the filling liquid on the remaining two opposed sides on the rear side of the screen frame simultaneously with the attachment of the tape on the remaining opposed two sides of the screen frame, thereby taping the screen frame.

According to still another aspect of the invention, there is provided a method of filling a screen frame comprising the steps of: holding a screen frame in such a manner as to be indexable 90 degrees; applying a filling liquid simultaneously onto two opposed sides or portion of the screen frame on the rear surface thereof through linear motions; rotating the screen frame 90 degrees; and applying the filling liquid simultaneously on the remaining two opposed sides or portion of the rotated screen frame on the rear surface thereof through linear motions, thereby taping the screen frame.

As described above, in accordance with the methods of the present invention, an advantage is achieved in that the operations of filler taping and filling with respect to a screen frame for screen printing can be automated, thereby simplifying, facilitating and optimizing the operations.

Figure 1:
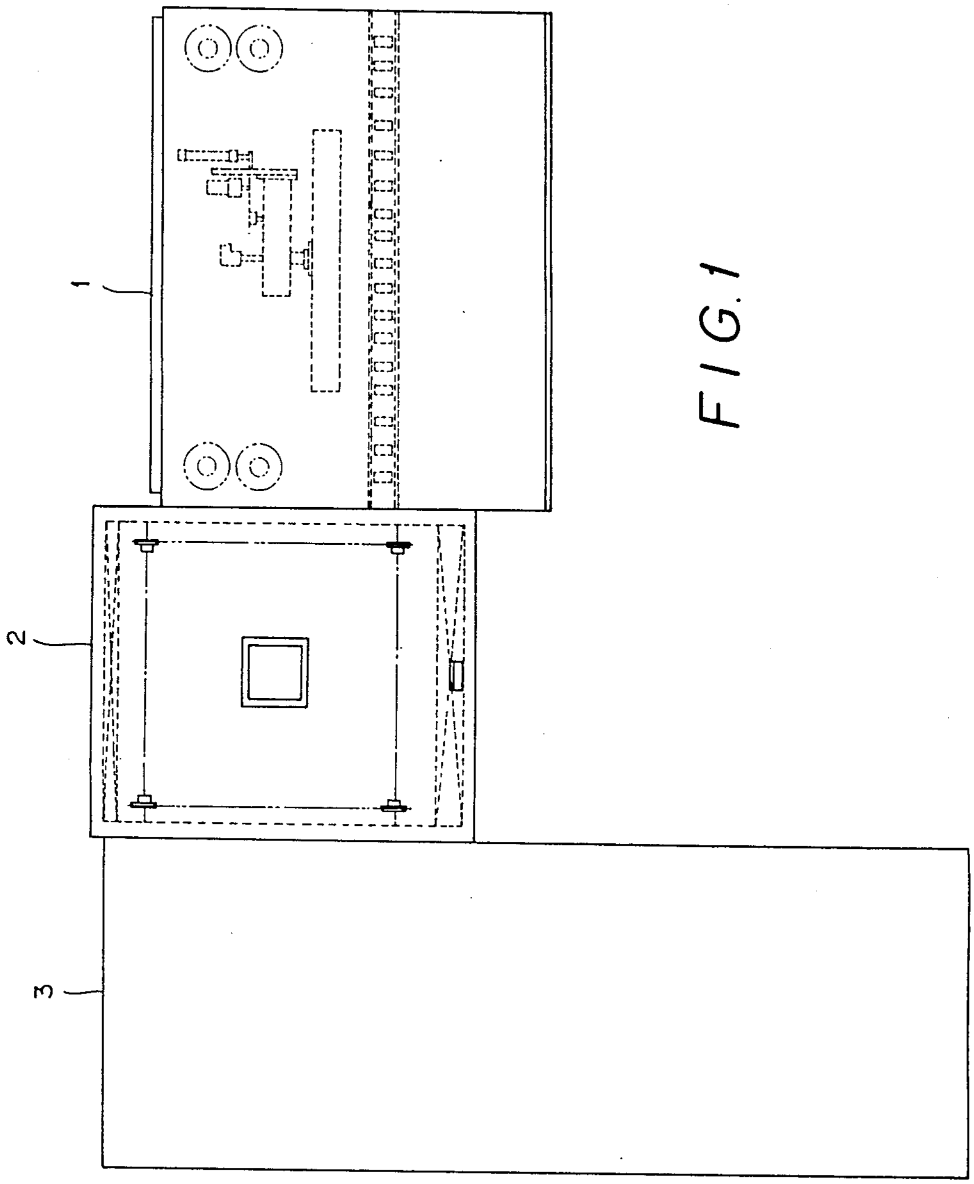
FIG. 1 is a diagram illustrating the layout of a filler taping apparatus employed in implementing the methods of the present invention.

DESCRIPTION OF THE PREFERRED EMBODIMENTS:

Referring now to the accompanying drawings, a description will be given of the preferred embodiments of the present invention.

The drawings illustrate a filler taping apparatus 1 which is employed in implementing a method of filler taping a screen frame in accordance with the method of the present invention. The filling of a screen frame 20 is carried out automatically through a series of continuous operations by this filler taping apparatus 1 in combination with a drier 2 and a storage apparatus 3.

As shown in FIGS. 1 to 4, the filler taping apparatus 1 comprises a carrying-in and carrying-out conveyor 4, a frame clamping device 5, taping devices 6, 7, and filling liquid applying devices 8, 9.

To give an outline of the apparatus, the carrying-in and carrying-out conveyor 4 intermittently conveys the screen frame 20 set in a vertical position by the joint use of a chain conveyor and a roller conveyor thereof, and feeds the same from a feeder, such as a screen stretching device, to the taping apparatus 1, then to the drier 2, and further to the storage apparatus 3. In the front of the clamping device 5, the conveyor 4 is moved vertically by an air cylinder 19 so as to operate in cooperation with the clamping device 5. The conveyor 4 is provided with notches 60 shown in FIG. 2 and operates in cooperation with claws 28 of a frame clamp 23, which will be described below.

The clamping device 5 retracts while clamping the screen frame 20 placed on the conveyor 4. Subsequently, after a pair of the upper and lower taping devices 6, 7 perform taping on the upper and lower portions of the screen frame 20, the clamping device 5 rotates the screen frame 20 through an angle of 90 degrees and, after the taping is similarly performed again, the clamping device 5 moves forward to return the screen frame 20 onto the conveyor 4.

The taping devices 6, 7 respectively have taping heads 10, 11, tape takeup and releasing paper takeup devices 12, 13, side tape attaching devices 14, 15, and edge tape attaching devices 16, 17, and attach a tape on the screen stretched on the screen frame 20 clamped by the clamping device 5.

Filling liquid applying devices 8, 9, arranged as a pair on the left- and right-hand sides, are used to apply a filling liquid in the vertical direction from the rear side of the screen frame 20 clamped by the clamping device 5. In the same way as the taping devices 6, 7, the filling liquid applying devices 8, 9 again apply the filling liquid in the vertical direction after the clamping device 5 has rotated the screen frame 20.

Upon completion of the application of the filling liquid, the screen frame 20 is conveyed by the conveyor 4 to enter the drying apparatus 2 for drying. Upon completion of drying, the screen frame 20 is stored in the storage apparatus 3 in juxtaposition with other screen frames.

As shown in FIGS. 2 to 5, the frame clamping device 5 has a frame 21, a clamp frame 22 arranged to be slidable back and forth relative to the frame 21, a clamp 23 rotatably supporting the screen frame 20 relative to the clamp frame 22, and a rotating device 24 (FIG. 5) for rotating the clamp 23.

Figure 2:
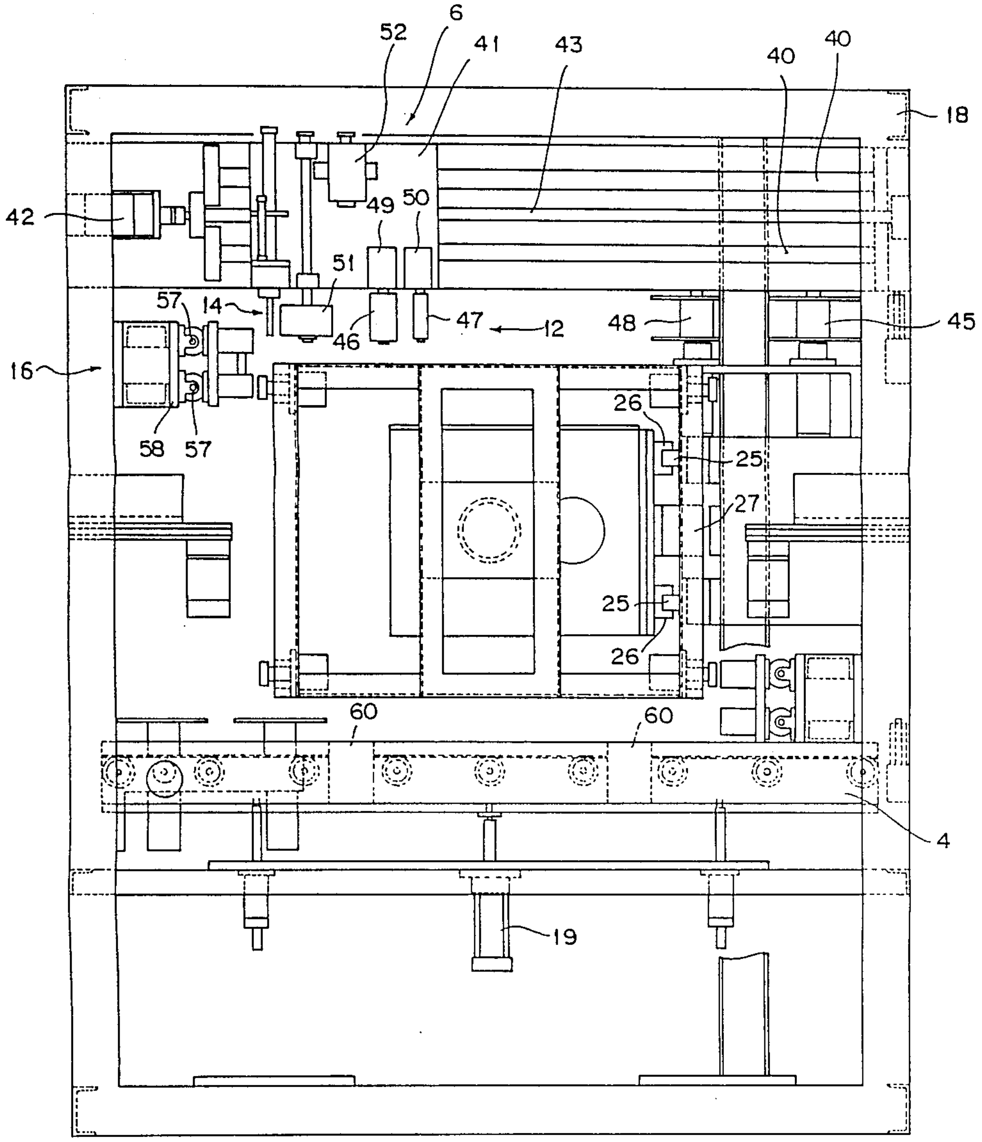
FIG. 2 is a front elevational view with some parts of the apparatus removed.
Figure 3:
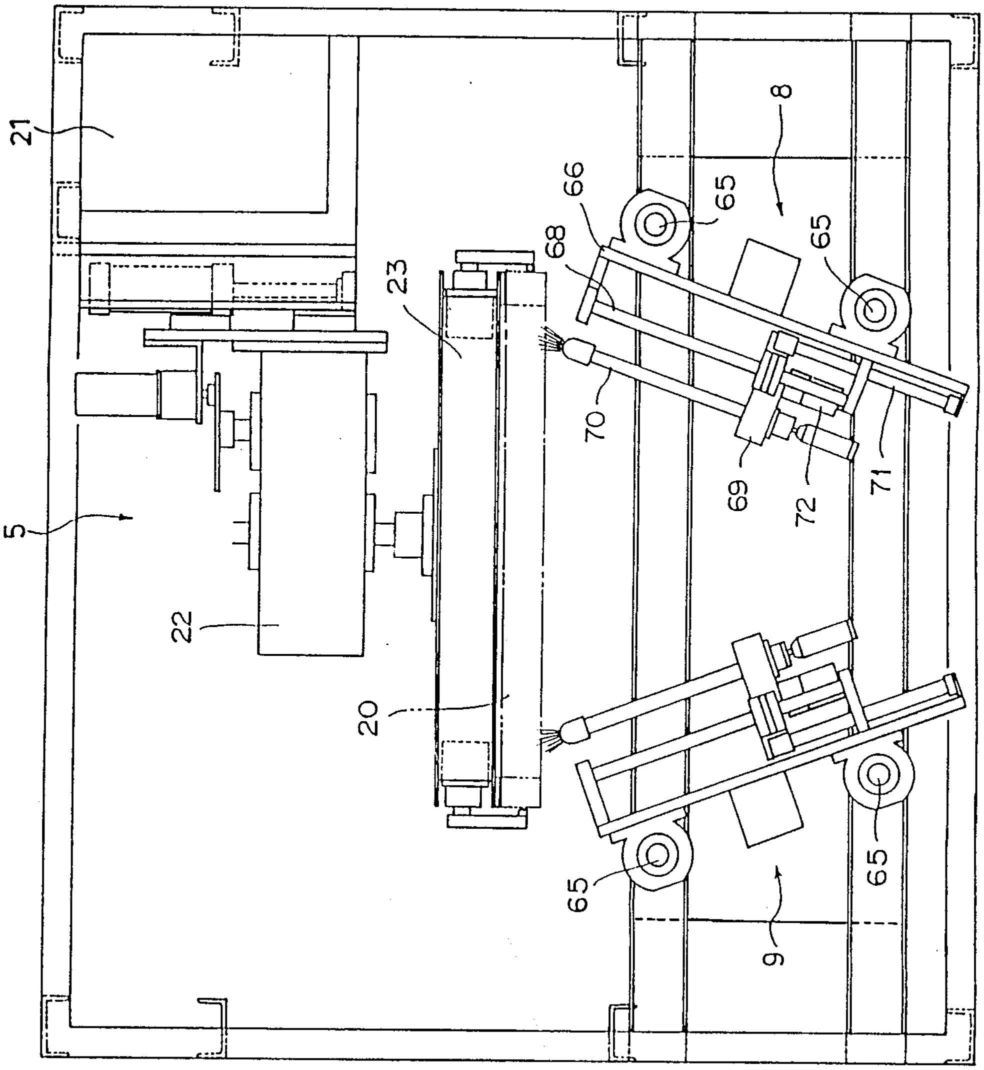
FIG. 3 is a top plan view with some parts shown in FIG. 2 removed.
Figure 4:
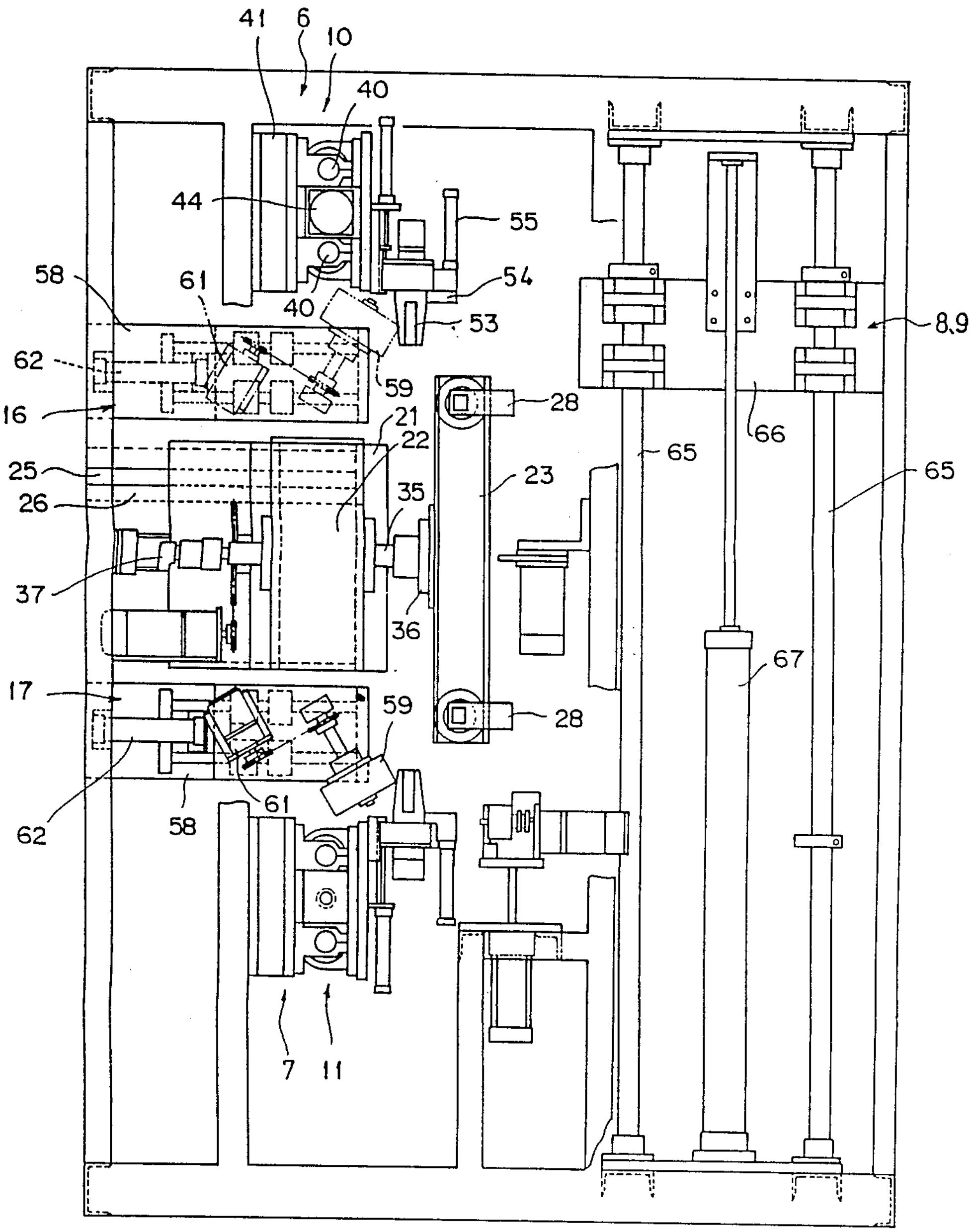
FIG. 4 is a side elevational view with some parts shown in FIG. 2 removed.

As shown in FIG. 2, the frame 21 has a pair of lateral guide rails 25 which respectively engage with a pair of U-shaped sliding members 26 projecting laterally from the clamp frame 22, that the sliding members 26 are slidable along the guide rails 25. The sliding is performed by an air cylinder 27. Since the clamp frame 22 moves only between fixed positions in the transverse direction, and the clamp frame 22 does not stop at an intermediate position, only an adjusting device (not shown) is needed.

Figure 5:
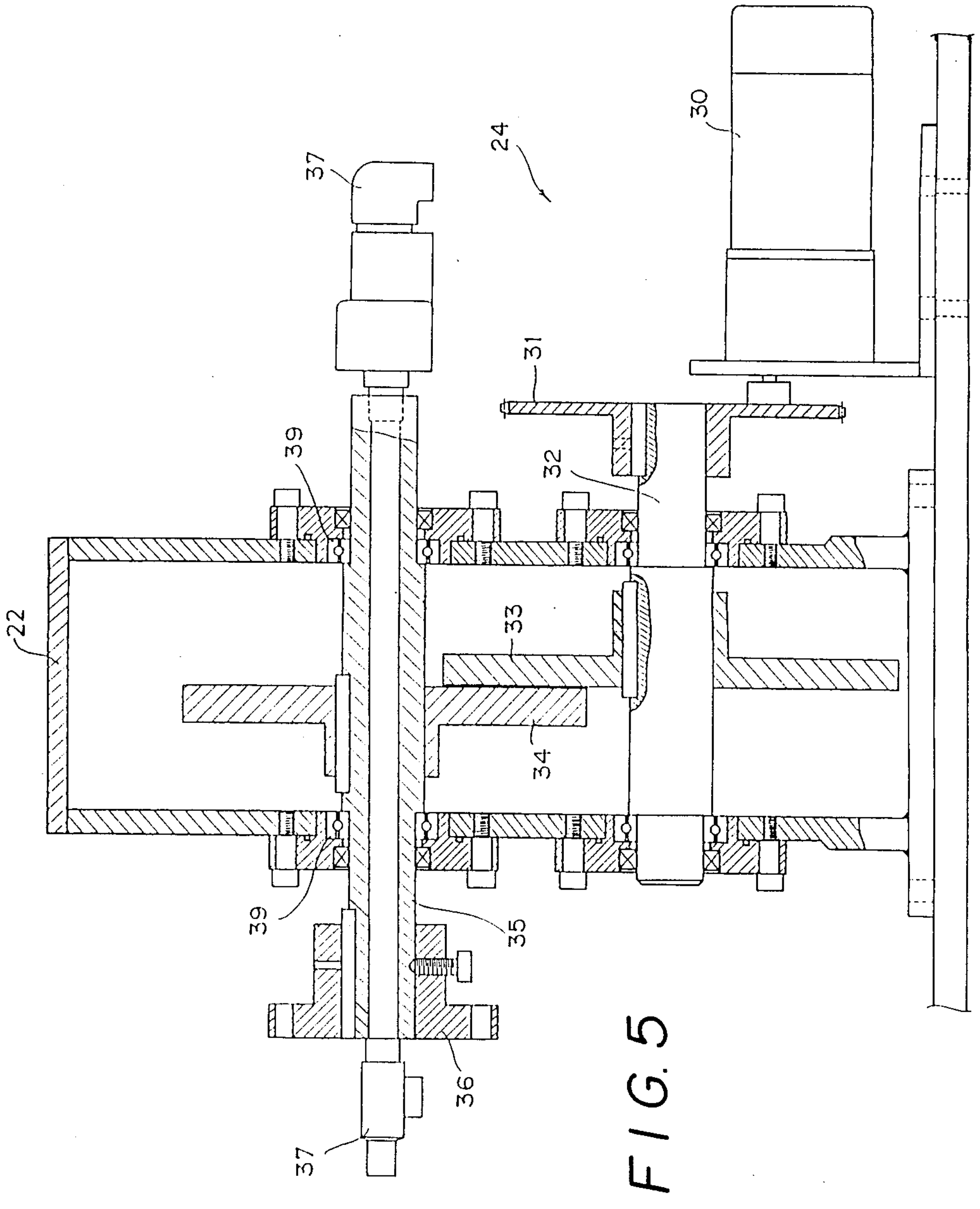
FIG. 5 is a partially enlarged cross-sectional view of a frame clamping device of the filler taping apparatus shown in FIG. 2.

The clamp 23 has a rectangular shape, as illustrated in the drawings, and its width is substantially equal to that of the screen frame 20. The clamp 23 has four air operated claws 28 at four corners thereof for clamping the screen frame 20 from both sides in cooperation with an air cylinder. As shown in FIG. 5, the clamp rotating device 24 is driven by a Geneva-type geared motor 30 via a sprocket 31, a shaft 32, gears 33, 34, and a shaft 35 to rotate a flange 36. The clamp 23 is installed on the flange 36. Air for operating the claws 28 is supplied through an air pipe 37 provided through the shaft 35. The shaft 35 needs to hold the clamp 23 firmly, and is rotatably supported by the frame 22 by means of bearings 39. A positioning pin (not shown) is used to accurately restrict the relative positions of the clamp 23 and the frame 22.

The pair of upper and lower taping devices 6, 7 are symmetrical with each other, and since they perform an identical operation, a description will be given of one of them, and identical reference numerals will be used for the respective parts of the other taping device. The taping head 10 has a carriage 41 guided by a pair of upper and lower guide rods 40 installed on a frame 18 and is moved to the left and right in FIG. 2 by a ball screw device 44 engaging with a screw rod 43 which is rotated by a geared motor 42.

The carriage 41 is provided with a chuck 53, which is normally in the open state. Upon completion of the attaching of the tape, the chuck 53 is operated by an air cylinder to clamp the tape, and a cutter 54 is moved in the transverse direction of the tape by means of an air cylinder 55 to cut the attached tape. At the time of a returning operation of the carriage 41, the chuck 53 clamps the tape to facilitate the starting of an attaching operation in an ensuing process.

The tape takeup and releasing paper takeup device 12 supplies a tape with a back sheet paid out from a reel 45, to a tape pressing roller 46 via a plurality of rollers (not shown). The roller 46 is flexibly supported by the carriage 41 to attach the tape to the screen frame 20. The back sheet is released by a back sheet releasing roller 47, and is taken up onto a takeup reel 48 via a plurality of rollers (not shown). The rollers 47, 48 are respectively driven by torque motors 49, 50.

The side tape attaching device 14 has a brush roller 51 supported by the carriage 41, and is rotated at a relatively high speed by an air cylinder 52 so as to apply under pressure the tape which has been attached by the tape pressing roller 46.

The edge tape attaching device 16 has a carriage 58 which is slidably supported along guide rods 57 supported by the frame 18 perpendicularly of the movement of the carriage 41 of the taping head. The edge tape attaching device 16 attaches at short strokes a cut edge portion of the attached tape which projects from the screen frame 20. The brush which is attached diagonally on the carriage 58 is rotated by an air cylinder 61 at a relatively high speed, and attaches an end portion of the tape in cooperation with the movement of the carriage 58. The carriage 58 is operated by an air cylinder 62 which is installed between the same and the frame 18.

The filling liquid applying devices 8, 9 are arranged on the left- and right-hand sides and apply a filling liquid on an inner surface of the screen frame 20 on the rear side thereof opposite to the side where the tape is attached. Hence, a description will be given of only one device 8.

The filling liquid applying device 8 has two upright rods 65 secured to the frame 18, a carriage 66 engaging slidably with the rods 65, an air cylinder 67 with a long stroke for vertically moving the carriage 66, a brush retainer 69 which is slidable along a guide rail 68 on the carriage 66, a brush 70 provided on the retainer 69, an air cylinder 71 for moving the brush 70 back and forth, and a feeder (not shown) for feeding a filling liquid to the brush. The brush 70 is rotatively driven by a motor 72.

A description will now be given of the operation of the taping apparatus and a method of filler taping the screen frame in accordance with the present invention.

The screen frame 20 which is placed on the conveyor 4, shown in FIG. 2, via a conveyor passage (not shown) retains a vertical position in a state in which the stretching of the screen has been completed.

First, the conveyor 4 supporting the screen frame 20 is raised by means of the air cylinder 19 so that the center of the frame is aligned with the axis of the shaft 35 of the clamp 23. At this juncture, the clamp table 22 is advanced by the air cylinder along the guide rails 25, 26 until the front surface of the clamp 23 is substantially brought into contact with the screen frame 20. By virtue of air from the air supplying pipe 37, the claws 28 releasably clamp both sides of the screen frame 20 and the clamp table 22 is retracted in the clamped state.

At this juncture, the taping devices 6, 7 start to operate. The tape held by the chuck 53 on each carriage 41 attaches the tape onto the screen frame 20 as the taping devices 6, 7 move along the upper and lower sides of the frame by the respective carriages 41. The tape is supplied from the reel 45, reaches the roller 46, and is attached on the frame surface. The back sheet, i.e., releasing paper, is released by the roller 47, and is taken up onto a reel 48 via a train of rollers (not shown). The brush 51 is designed to press the surface of the attached tape, to ensure that attachment is effected positively. When the tape is attached to the end of the frame, the chuck 53 holds the tape end at a position exceeding the frame end; and the knife 54 cuts the tape by the operation of an air cylinder 55. The carriage 41 then returns to its original position by the operation of the motor 42, the screw rod 43, and the ball screw 44, while the chuck 53 continues to hold the tape end.

Subsequently, the edge tape attaching devices 16, 17 are advanced by the air cylinder 62 to attach the edge portion of the tape projecting from the edge portion of the screen frame 20. In other words, the air cylinder 62 advances the carriage 58, and the brush 59 installed diagonally on the carriage is rotated by the air cylinder 61 so as to be pressed against the projecting edge portion of the tape to effect adhesion.

At the same time, the carriages 66 of the filling liquid applying devices 8, 9 are moved by the air cylinders 67 along the rods 65. The air cylinders 71 are operated at required positions to bring the distal ends of the brushes 70 into contact with the inner surface of the frame and to apply the filling liquid from the filling liquid feeder. At the same time, the brushes 70 are rotated by the motors 72. The carriages 66 are then moved vertically by the air cylinders 67.

Thus, taping is carried out on the upper and lower portions of the outer surface of the screen frame 20, and the filling liquid is applied to both sides of the inner surface of the screen frame.

Subsequently, the positioning pin (not shown) is withdrawn, and the indexing device shown in FIG. 5 is operated to rotate the frame clamp 23 through an angle of 90 degrees. Namely, the Geneva-type motor 30 is operated, and the rotation is imparted to the frame clamp 23 via the sprocket 31, the shaft 32, the gears 33, 34, the shaft 35, and the flange 36, and the frame clamp 23 is secured by the positioning pin.

The clamp table 22 is advanced by the air cylinder 27 so as to be placed on the conveyor 4, the clamp 23 is separated from the screen frame 20 by loosening the claws 28, and the clamp table 22 is then withdrawn. At this time, the claws 28 are in a vertical position, and are withdrawn through the notches 60 provided in the conveyor 4. The Geneva-type motor 30 rotates the flange 36 and the clamp 23 90 degrees, as described above, and the claws 28 assume their transverse positions again. At this time, the screen frame 20 is placed on the conveyor 4 and does not rotate.

The clamp table 22 is advanced by the air cylinder, the left- and right-hand edge portions of the screen frame 20 on the conveyor 4 are clamped by the claws 28, and the clamp table 22 is retracted. The screen frame 20 is in a state in which it has been rotated 90 degrees, and the taping and the application of the filling liquid are performed on the unprocessed upper and lower portions of the outer surface and the both sides of the inner surface of the screen frame 20 in the same way as described above.

The completed screen frame assumes its position above the conveyor 4 by the advancement of the clamp table 22, and is delivered onto the conveyor 4 as the claws 28 of the clamp 23 are loosened and the conveyor 4 is raised. Subsequently, the clamp table 22 is withdrawn, the conveyor 4 is lowered, and the screen frame 20 placed on the conveyor 4 is conveyed to the drier 2.

The screen frame 20 is conveyed in the drier 2 in steps in a direction perpendicular to the advancing direction of the conveyor 4, and is dried by warm air. Upon completion of drying, the screen frame 20 is conveyed to the storage apparatus 3 by means of the conveyor 4, and is similarly conveyed in steps in the planar direction of the screen frame 20 so as to be stored.

As is evident from the foregoing description, a method of filler taping for a screen frame in accordance with the present invention is capable of automatically performing the attachment of a filler tape and the application of a filling liquid on outer and inner surfaces of the screen frame substantially in synchronism with an automatic screen stretching apparatus. Hence, the manual operations are completely dispensed with, thereby allowing automatic operations to be attained.

What is claimed is:

1. A method of filler taping a screen frame used in screen printing, comprising the steps of:

holding a screen frame in such a manner as to be indexable 90 degrees;

attaching a tape simultaneously to two spaced-apart portions on one side of said screen frame through linear motion of the tape relative to the screen frame and, simultaneously with attachment of the tape, applying a filling liquid on the two spaced-apart portions of the screen frame on the other side thereof;

rotating said screen frame 90 degrees; and attaching the tape simultaneously to two other spaced-apart portions on said one side of said screen frame through linear motion of the tape relative to the screen frame and, simultaneously with attachment of the tape, applying a filling liquid on the two other spaced-apart portions of the screen frame on said other side thereof.

2. A method of filler taping a screen frame according to claim 1, including the steps of holding the tape by a displaceable chuck during each attaching step; cutting the tape after each attaching step so that the free cut end of the tape is held by the chuck; and displacing the chuck to return the cut end of the tape to an original position of taping, thereby to maintain the continuity of the tape.

3. A method of filler taping a screen frame according to claim 2, further comprising the step of attaching to said screen frame the cut end of the tape projecting from said screen frame after each cutting step.

4. A method of taping a screen frame used in screen printing, comprising the steps of: providing a screen frame suitable for use in screen printing and having attached thereto a stretched screen; simultaneously attaching tape to two spaced-apart, parallel portions of one side of the screen; rotating the screen and frame through a predetermined angular increment; then simultaneously attaching tape to two other spaced-apart, parallel portions of the one side of the screen; and applying filling liquid onto the other side of the screen at regions opposite those where the tape is being attached simultaneously with the attachment of the tape to the screen.

5. A method according to claim 4; wherein the two attaching and the rotating steps are carried out while the screen frame is in a vertical orientation with the screen lying in a generally vertical plane.

6. A method according to claim 4; wherein the rotating step comprises rotating the screen frame through an angular increment of 90 degrees.

* * * * *